United States Patent
Winters et al.

(10) Patent No.: US 6,817,738 B1
(45) Date of Patent: Nov. 16, 2004

(54) MEDICAL FILM ILLUMINATOR

(75) Inventors: William P. Winters, New Rochelle, NY (US); David Kaplan, Brooklyn, NY (US)

(73) Assignee: Wolf X-Ray Corporation, West Hempstead, NY (US)

( * ) Notice: Subject to any disclaimer, the term of this patent is extended or adjusted under 35 U.S.C. 154(b) by 152 days.

(21) Appl. No.: 10/140,027

(22) Filed: May 6, 2002

(51) Int. Cl.$^7$ .............................................. F21V 15/06
(52) U.S. Cl. ...................... 362/368; 362/367; 362/388; 40/564; 40/574
(58) Field of Search .................................. 362/368, 367, 362/374, 398, 97, 98, 222, 223, 225, 249, 251, 260, 311; 40/361, 364, 367, 574, 564

(56) References Cited

U.S. PATENT DOCUMENTS 4,373,280 A * 2/1983 Armfield, III ................ 40/367
4,404,619 A * 9/1983 Ferguson ..................... 362/222
5,676,444 A * 10/1997 Liao ............................. 362/31

* cited by examiner

Primary Examiner—Sandra O'Shea
Assistant Examiner—John Anthony Ward
(74) Attorney, Agent, or Firm—John L. Rogitz

(57) ABSTRACT

A medical film illuminator includes a frame having a translucent panel. A film gripper is attached directly to the translucent panel and the translucent panel is attached to the frame using magnets that engage the frame. Thus, the translucent panel can be easily removed to service the interior of the frame. Moreover, the spacing between the gripper and panel is established during manufacture and does not change, thus ensuring that gripping tension on film that is slid between the gripper and panel remains constant during the life of the illuminator.

17 Claims, 2 Drawing Sheets

MEDICAL FILM ILLUMINATOR

I. FIELD OF THE INVENTION

The present invention relates generally to medical film illuminators.

II. BACKGROUND OF THE INVENTION

Medical film illuminators are extremely valuable diagnostic tools for use in hospitals, clinics, medical offices, etc. Medical film illuminators are typically used by medical professionals to illuminate medical films so that they may be accurately viewed. Thus, medical film illuminators are essential in the diagnosis and treatment of a broad range of physical ailments.

Conventional illuminators include a viewing box having four opaque side panels, an opaque back panel, and a translucent front panel that establishes a viewing area. Typically, at least two fluorescent tubes are placed within the box to illuminate the viewing area. During use, a medical film is placed over the viewing area. Light emitted by the fluorescent tubes is diffused by the translucent front panel and shines through the medical film. Thus, a user, e.g., a nurse or doctor, can accurately view the back-lit medical film.

Nearly all illuminators include a film gripper along the top edge of the viewing area in order to hold the medical film in place while it is being viewed. Current state-of-the-art illuminators are assembled so that the film gripper is fastened by screws directly to the viewing box, e.g., to the front face of the opaque top panel. The translucent front panel is inserted beneath the film gripper and its position is maintained by contact with the side panels. Since the film gripper is not attached to the front panel, the relationship between the film gripper and the front panel, e.g., the clearance therebetween that is required to the hold the medical film in place, can become maladjusted if the front panel is removed in order to change the fluorescent tubes within the illuminator. When this happens, a film that is subsequently slid into viewing position might not be adequately held in place.

Moreover, in most cases, the film gripper is affixed to the viewing box using machine driven screws. The screws, being machine driven, can be extremely difficult to remove when attempting to remove the film gripper for repair or replacement. Also, when the front panel is removed for service it can be re-installed upside down or backwards which can cause damage or adversely affect the performance of the illuminator in which the front panel is improperly installed.

Thus, the present invention recognizes that there is a need for a medical film illuminator that addresses one or more of the above-noted problems.

SUMMARY OF THE INVENTION

A film illuminating assembly includes a hollow frame that defines an open side. The frame is configured for supporting a light source inside of it. A light transmitting panel assembly is juxtaposed with the frame to cover the opening, and the panel assembly includes at least one magnetic strip, a light transmitting panel positioned to cover the open side of the frame, and a film gripper attached to the light transmitting panel. The magnetic strip is attached to the panel and/or to film gripper to complete the panel assembly. With this structure, the magnetic strip magnetically couples with at least a portion of the frame to hold the panel in a stationary relationship relative to the frame without the need for fasteners apart from the magnetic strip.

The panel can be made of, e.g., translucent plexiglass. If desired, the panel can be formed with a notch to receive a film switch component that might extend from the frame. The magnetic strips may be disposed on opposite sides of the notch from each other, if desired.

In another aspect, an assembly for viewing a medical film includes a light emanating frame and a light transmitting panel assembly that is removably engaged with the frame without the need for fasteners.

In yet another aspect, a medical film illuminator includes a frame having an open front and a light transmitting panel juxtaposed with the open front of the frame. A film gripper is attached to the panel. A magnetic element provides a magnetic coupling to hold the panel onto the frame.

In still another aspect, a method for viewing a medical film includes holding a translucent plate next to a light source frame using a magnetic coupling, and illuminating the plate so that the film may be juxtaposed with the plate to view the film.

The present invention will now be described, by way of example, with reference to the accompanying drawings, in which:

DESCRIPTION OF AN EMBODIMENT OF THE INVENTION

Figure 1:
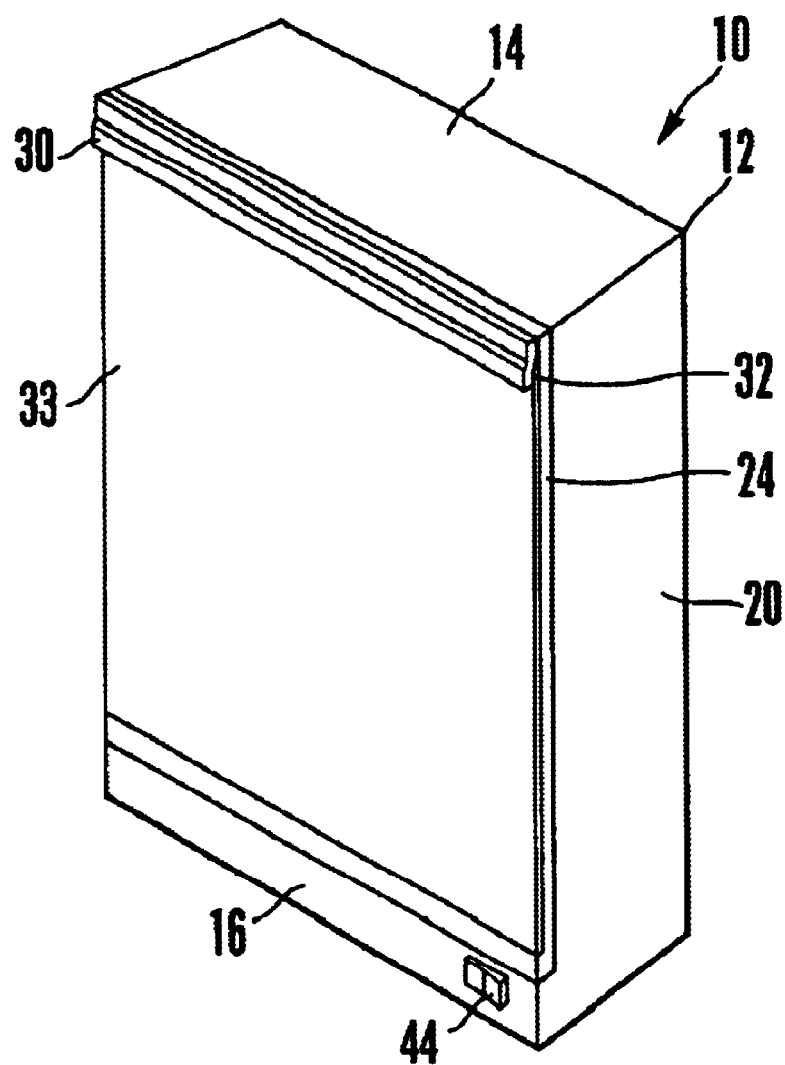
FIG. 1 is a perspective view of a medical film illuminator.
Figure 2:
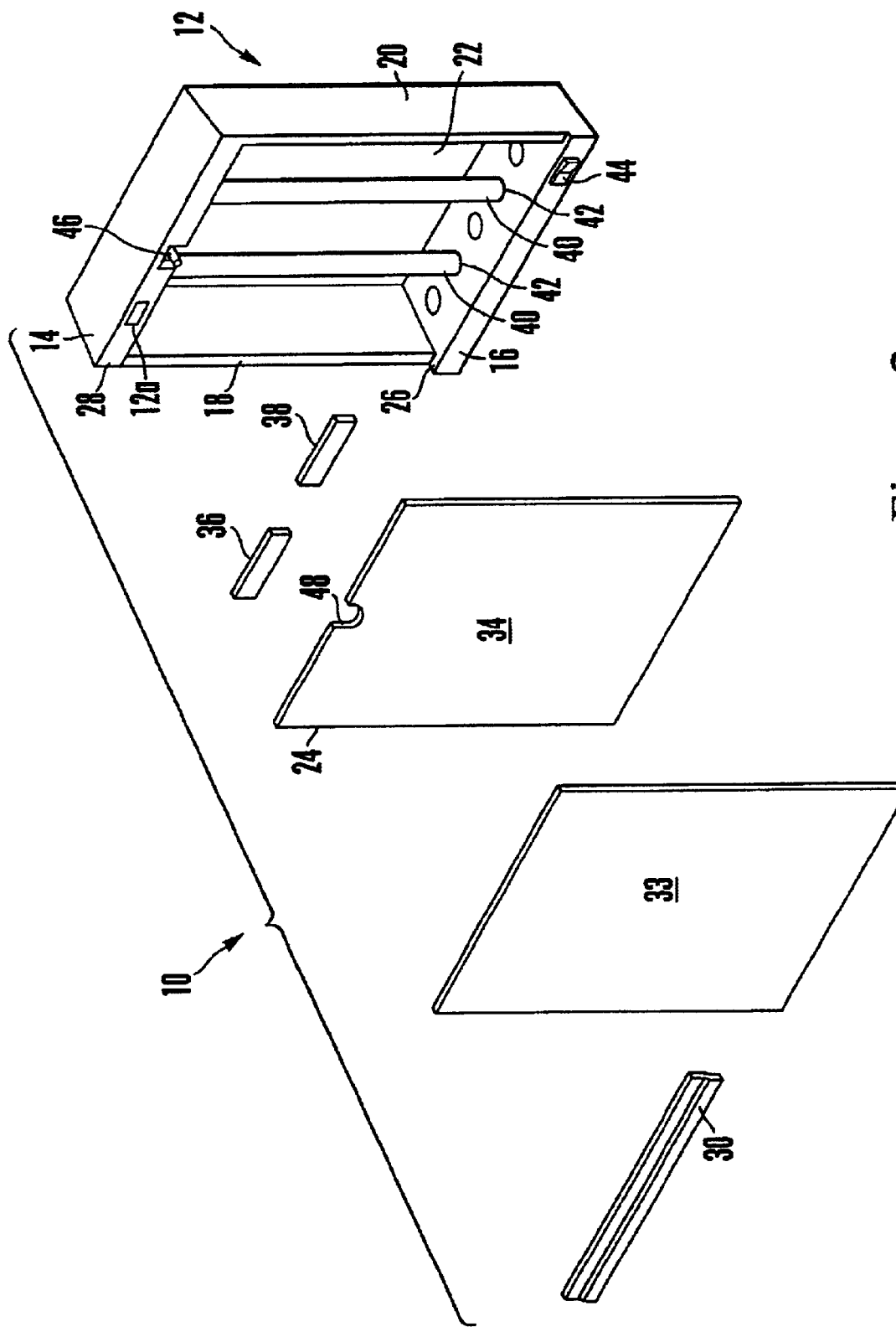
FIG. 2 is an exploded perspective view of the medical film illuminator.

Referring to FIGS. 1 and 2, a medical film illuminator is shown and generally designated 10. FIGS. 1 and 2 show that the illuminator 10 includes a preferably box-shaped rigid frame 12. As shown, the frame 12 includes an opaque top panel 14 and an opaque bottom panel 16 that are connected by an opaque left side panel 18 and an opaque right side panel 20. An opaque back panel 22 is attached to the rear edge of each of the panels 14, 16, 18, 20. In a preferred embodiment, the panels 14, 16, 18, 20, 22 that comprise the frame 12 are fabricated from metal, e.g., a light gauge steel or aluminum, and are welded, riveted, or otherwise mechanically attached to each other along their respective edges. However, it can be appreciated that the frame 12 can be made from any other suitable material well known in the art, e.g., plastic. When the frame is not made of a ferromagnetic material or if desired for a stronger magnetic coupling with the panel assembly described below, one or more magnetic or ferromagnetic or magnetic elements 12a can be incorporated as part of the frame (by, e.g., mechanically attaching the element 12a to the top panel 14) to magnetically engage the magnetic strips of the panel assembly disclosed below.

As shown in FIG. 1, the illuminator 10 includes a rigid translucent panel 24 that encloses the front of the frame 12. Preferably, the translucent panel 24 is made from plexiglass, but the translucent panel 24 can be made from any other translucent or even transparent material well known in the art. It is to be understood that the translucent panel 24 may rest on a lip 26 (FIG. 2) that is established by the bottom panel 16 and, as described in detail below, engages a front face 28 established by the top panel 14. It can be appreciated that the bottom panel 16 can form a groove (not shown) in which the bottom of the translucent panel 24 is disposed when it is properly engaged with the frame 12, as described below.

FIGS. 1 and 2 show that the illuminator 10 includes a film gripper 30 that is attached to the translucent panel 24. In a preferred embodiment, the film gripper 30 is glued or otherwise mechanically attached to the front of the translucent panel 24. As shown in FIG. 1, a gripping area 32 is established between the translucent panel 24 and the film gripper 30. It is to be understood that the gripping area 32 has a thickness that is slightly smaller than the thickness of a medical film 33 so that a compressive force is created between the film gripper 30 and the translucent panel 24 in order to hold the medical film within the griping area 32.

FIG. 1 shows that the panel 24 defines a viewing area 34 below the film gripper 30. Thus, when the edge of the medical film 33 is installed in the gripping area 32 between the film gripper 30 and the translucent panel 24 the film 33 hangs down in front of the translucent panel 24 so that it can be illuminated as described in detail below. It is to be understood that the viewing area is approximately fourteen inches by seventeen inches (14"×17") and that the illuminator can have one or more viewing areas so that one or more films may be viewed at the same time.

As shown in FIG. 2, at least one and preferably a first magnetic strip 36 and a second magnetic strip 38 are glued or otherwise attached to the back of the translucent panel 24 opposite the film gripper 30 to establish a panel assembly that can be magnetically held onto the frame 12 without the need for fasteners. The magnetic strips 36, 38 magnetically engage the frame 12 and/or magnetic element(s) 12a to hold the panel assembly against the frame 12.

In another non-limiting, exemplary embodiment, the magnetic strips 36, 38 can be attached directly to the film gripper 30 in a recess that can be established between the film gripper 30 and panel 24 to establish the panel assembly. If desired, the strips 36, 38 can be glued or otherwise attached to the panel 24 with the gripper 30 mechanically mating with one or more of the strips 36, 38 to thereby attach the gripper 30 to the panel 24. Or, both the gripper 30 and strips 36, 38 can be directly glued or otherwise attached to the panel 24.

Preferably, the magnetic strips 36, 38 are permanent magnets having relatively strong magnetic fields. For example, the magnetic strips 36, 38 can be Neodymium magnets. Accordingly, the magnetic coupling between the magnetic strips 36, 38 and a ferromagnetic front face 28 of the top panel 14 (or with the magnetic element(s) 12a on the front face) holds the translucent panel 24 against the frame 12.

It can be appreciated that in an alternative configuration, the magnetic element 12a can be glued or otherwise affixed to the front face 28 of the top panel 14 as described above, and a ferromagnetic or magnetic film gripper 30 can be glued or otherwise attached to the front of the translucent panel 24. Thus, when the translucent panel 24 is properly placed on the frame 12, as shown in FIG. 1, the film gripper 30 itself magnetically engages the element(s) 12a to the hold the translucent panel 24 securely against the frame 12, without the need for separate magnetic strips 36, 38 on the panel assembly.

FIG. 2 further shows that the illuminator includes at least two fluorescent tubes 40 that are placed vertically within the frame 12, e.g., between electrical sockets 42 formed in the bottom panel 16 and the top panel 14. It is to be understood that the illuminator 10, as shown, can hold between one and several fluorescent tubes 40. The current industry standard is between two and six fluorescent tubes per each fourteen inch by seventeen inch viewing area.

Also, as shown in FIGS. 1 and 2, the illuminator 10 includes a main power switch 44 that can be used to turn power to the illuminator 10 on and off. The illuminator 10 also includes a film switch 46 that can be used to control the power to the fluorescent tubes 40. The film switch 46 extends beyond the front face 28 of the upper panel 14 and through a notch 48 formed in the top edge of the translucent panel 24 so that the end of the film switch 46 protrudes into the gripping area 32 between the film gripper 30 and the translucent panel 24. It can be appreciated that the illuminator 10 can be constructed without the film switch 46 and thus, the notch 48 can be omitted.

When a medical film 33 is installed in the illuminator 10 such that the edge of the film 33 is held by the film gripper 30 within the gripping area 32, the edge of the film 33 closes the film switch 46 to energize the fluorescent tubes 40. The light from the fluorescent tubes 40 is transmitted through the translucent panel 24 and the film 33 is illuminated. It is to be understood that the interior of the panels 14, 16, 18, 20, 22 can be painted with a highly reflective color or coating, highly polished, or mirrored so that they reflect an optimum amount of light emanating from the fluorescent tubes 40 when the fluorescent tubes 40 are energized as described above.

With the configuration of structure and method described above, it can be appreciated that the medical film illuminator 10 provides a translucent panel 24 than can be easily disengaged with the frame 12 in order to service the interior of the frame 12, e.g., replace the fluorescent tubes 40 therein. Also, since the film gripper 30 is attached directly to the translucent panel 24 it can be appreciated that the compressive force between the translucent panel 24 and the gripper 30 can not be compromised. Moreover, the attachment of the gripper 30 to the translucent panel 24 prevents the translucent panel 24 from being improperly installed on the frame 12.

While the particular MEDICAL FILM ILLUMINATOR as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A film illuminating assembly, comprising:
at least one hollow frame defining at least one open side, the frame being configured for supporting at least one light source therein; and at least one light transmitting panel assembly including;

at least one magnetic strip;

at least one light transmitting panel positioned to cover the open side of the frame; and at least one film gripper attached to the light transmitting panel, the magnetic strip being attached to at least one of: the panel and film gripper, the magnetic strip magnetically coupling with at least a portion of the frame to hold the panel in a stationary relationship relative to the frame.

2. The assembly of claim 1, comprising at least two magnetic strips.

3. The assembly of claim 1, wherein the magnetic strip is magnetically coupled to the frame, whereby the film gripper and the panel are held in a stationary relationship with the frame without the need for fasteners apart from the magnetic strip.

4. The assembly of claim 1, wherein the panel is made of plexiglass.

5. The assembly of claim 4, wherein the panel is translucent.

6. The assembly of claim 1, wherein the panel is formed with at least one notch to receive at least one film switch component extending from the frame.

7. The assembly of claim 2, wherein the panel is formed with at least one notch and the magnetic strips are disposed on opposite sides of the notch from each other.

8. A medical film illuminator, comprising:

a frame having an open front;

a light transmitting panel juxtaposed with the open front of the frame;

a film gripper attached to the panel; and a magnetic element providing a magnetic coupling to hold the panel onto the frame.

9. The illuminator of claim 8, wherein the magnetic element is at least one strip of magnetic material.

10. The illuminator of claim 8, wherein the magnetic element is magnetically coupled to the frame, whereby the film gripper and the panel are held in a stationary relationship with the frame without the need for fasteners apart from the magnetic element.

11. The illuminator of claim 10, wherein the magnetic element is attached to the panel.

12. The illuminator of claim 10, wherein the magnetic element is attached to the film gripper.

13. The illuminator of claim 10, wherein the panel is translucent.

14. The illuminator of claim 10, wherein the panel is formed with at least one notch to receive at least one film switch component extending from the frame.

15. The illuminator of claim 14, comprising at least first and second magnetic elements, at least one on each side of the notch.

16. A method for viewing a medical film, comprising the acts of:

holding a translucent plate next to a light source frame using at least one magnetic coupling;

illuminating the plate; and juxtaposing the film with the plate to facilitate viewing the film.

17. The method of claim 16, wherein the plate is held next to the frame without the need for fasteners.

* * * * *